United States Patent
Shome et al.

(10) Patent No.: US 9,457,494 B2
(45) Date of Patent: Oct. 4, 2016

(54) METHOD AND APPARATUS FOR MICROWAVE AND CONVECTION COMPOSITE CURING

(71) Applicant: The Boeing Company, Chicago, IL (US)

(72) Inventors: Moushumi Shome, Kent, WA (US);
Janet Mary Layng, Tacoma, WA (US);
Waeil M. Ashmawi, Seattle, WA (US);
Sahrudine Apdalhaliem, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 14/481,851

(22) Filed: Sep. 9, 2014

(65) Prior Publication Data
US 2016/0067888 A1   Mar. 10, 2016

(51) Int. Cl.
  *B29C 35/08* (2006.01)
  *B29C 35/02* (2006.01)
  *B29C 70/44* (2006.01)
  *B29L 31/30* (2006.01)

(52) U.S. Cl.
  CPC .......... *B29C 35/0805* (2013.01); *B29C 35/02* (2013.01); *B29C 70/44* (2013.01); *B29C 2035/0855* (2013.01); *B29L 2031/3055* (2013.01); *B29L 2031/3067* (2013.01); *B29L 2031/3076* (2013.01)

(58) Field of Classification Search
  CPC ............... B29C 35/0805; B29C 2035/0855; B29C 70/44; B29C 35/02; B29C 35/04; B29C 35/045; B29C 2035/046; B29C 35/049; B29L 2031/3076; B29L 2031/3055; B29L 2031/3067
See application file for complete search history.

(56) References Cited

U.S. PATENT DOCUMENTS 4,333,003 A * 6/1982 Rivera ............ F26B 3/283
                                            392/411
4,477,707 A   10/1984 Kim
(Continued)

FOREIGN PATENT DOCUMENTS

EP   0 889 775 B1   2/2003

OTHER PUBLICATIONS

Ku et al., "Processing of Composites Using Variable and Fixed Frequency Microwave Facilities", Progress in Electromagnetics Research B, 2008, vol. 5, pp. 185-205.
(Continued)

*Primary Examiner* — Jacob T Minskey
*Assistant Examiner* — Vishal I Patel
(74) *Attorney, Agent, or Firm* — McDonnell Boehnen Hulbert & Berghoff LLP

(57) ABSTRACT

Method and apparatus for curing a composite laminate. The apparatus comprising an electromagnetic radiation source creating electromagnetic microwave energy in an enclosed volume and a heating source for providing a convective airflow in the enclosed volume. A composite laminate assembly comprising a composite laminate is placed in the enclosed volume, wherein the composite laminate of the composite laminate assembly is cured by both the electromagnetic microwave energy created by the electromagnetic radiation source, and the convective airflow provided by the heating source. A vacuum bag may be placed over the composite laminate assembly. A source may be activated such that a vacuum within the vacuum bag is created according to design specifications.

20 Claims, 4 Drawing Sheets

(56) References Cited

U.S. PATENT DOCUMENTS

| | | | |
|---|---|---|---|
| 8,506,873 B2 | 8/2013 | Graeber et al. | |
| 2004/0130072 A1* | 7/2004 | Sekido | B29C 70/443 264/408 |
| 2011/0163480 A1* | 7/2011 | Herkner | B29C 33/06 264/489 |
| 2013/0285292 A1* | 10/2013 | Sanderson | B29C 35/0805 264/402 |

OTHER PUBLICATIONS

Kwak et al., "Curing of Composite Materials Using the Recently Developed Hephaistos Microwave", 18th International Conference on Composite Materials, Advanced Materials and Processes Group, TWI Technology Centre (North East) Middlesbrough, UK, 6 pages.

Feher et al., "Composite Manufacturing by using a novel modular 2.45 GHz Microwave Processing System", 36th International SAMPE Technical Conference, San Diego, Nov. 15-18, 2004, 12 pages.

Feher et al., "An Industrial HEPHAISTOS Microwave Based Composite Processing Technology", IHM—Forschungszentrum Karlsruhe GmbH, D-76021 Karlsruhe, Germany, 6 pages.

Pelesko, J. A., "Microwave Heating of Ceramic Composites", IMA Journal of Applied Mathematics, 2000, vol. 64, pp. 39-50.

Feher et al., "Microwave curing of composite structures at HEPHAISTOS Experimental Centre (HEC)", Plasma Science, 2008, IEEE 35th International Conference, 2 pages.

Yusoff et al., "Curing of Polymeric Composites Using Microwave Resin Transfer Moulding (RTM)", Journal of Engineering Science and Technology, 2007, 2(2), pp. 151-163.

\* cited by examiner

METHOD AND APPARATUS FOR MICROWAVE AND CONVECTION COMPOSITE CURING

FIELD

The present disclosure relates generally to the curing of composite laminates.

More particularly, the present disclosure relates to the curing of composite laminates utilizing both microwave and convection.

BACKGROUND

Composite laminates and structures are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft manufacturing and assembly, such composite laminates and structures are used in increasing quantities to form the fuselage, wings, tail section, skin panels, and other components.

Aerospace manufacturers increasingly use composite laminates in an effort to reduce the weight and increase the performance of some components, thereby reducing the weight and improving the efficiency of aircraft. Composite laminates used by the aerospace industry typically comprise a fiber-reinforced composite material. Fiber-reinforced composite materials of this type generally comprise two essential components, namely firstly the fibers and secondly a polymer matrix which surrounds the fibers. The matrix encompasses the fibers and is typically cured by a thermal treatment (polymerization), such that three-dimensional cross-linking takes place. This polymerization has the effect that the fibers are bonded firmly to one another and therefore forces can be introduced into the fibers, namely predominantly via shear stresses. Suitable fibers are both carbon fibers and possibly also glass fibers.

A composite component comprising a fibrous material in a matrix material may be produced by arranging one or more ply layers of fibrous material on a mold tool and curing the component to form a consolidated component. Typically, the fibrous material is provided in the form of one or more "pre-preg" layers. Alternatively one or more "dry" ply layers may be arranged on a mold tool and a matrix material may be applied to the ply layers.

Once the preform of fibers and matrix material has been introduced into a mold, both are heated. This has the effect of initiating a polymerization of the matrix material, and the fibers and the matrix material adhesively bond to one another, so that the fiber-composites component is created. Heating of the composite laminate may be performed, for example, by means of convection. However, convection curing has certain perceived disadvantages.

For example, in such conventional or surface-heating systems, such as those found in autoclaves, a composite part heats from the outside in, as heat energy is transferred through the composite laminate's thickness. The process duration of a thorough cure, therefore, is determined by the rate of heat flow into the composite laminate. As such, the flow rate depends on the material's specific heat, thermal conductivity, density, and viscosity. As a result, the edges and corners of the composite laminate may achieve the set point temperature before the center of the composite laminate achieves this set temperature. The composite laminate also heats at an uneven rate, which can stress the final cured laminate. Therefore, the temperature in the autoclave and a convection heating source is typically ramped up and down slowly in an attempt to minimize part stress, a factor that makes overall temperature control a challenge. As such, autoclave or oven curing may be a time consuming process, typically lasting for approximately four hours. Another perceived drawback of autoclave or oven curing is that such a process also uses a large amount of energy because the autoclave itself is heated as well as the component.

Alternatively, electromagnetic microwave energy may be used for heating the composite laminate. In contrast to convection, microwave radiation relies on volumetric heating. That is, microwave radiation transfers heat energy electromagnetically and relatively evenly and quickly throughout the composite laminate, but not as a thermal heat flux. As such, electromagnetic heating can in certain applications enable better process temperature control and less overall energy use. As a consequence, in certain situations, a shorter cure cycle may be obtained. Electromagnetic heating also enables the process to direct heat specifically toward the part to be cured, thereby maximizing curing process efficiency. Shorter cure cycles are possible because the microwave oven requires minimal ramp-up to set point temperature and the process has less tooling-driven thermal lag. Further, when cure is complete and the oven shuts off, there is no cool-down of the oven itself. As such, cure cycles can be made even more efficient.

However, composite laminate curing by way of electromagnetic radiation also has certain perceived limitations. For example, it has been found that the interaction with the microwave field has the effect that dipole molecules of the matrix material are made to vibrate, so that the matrix material heats up. It has also been found that electromagnetic radiation with microwaves can cause undesired temperature gradients to occur in the composite laminate. In certain composite laminate configurations, it has been found that the highest temperatures are found at the borders of the composite laminate. Such temperature gradients are undesired and can cause hot spots or sparking For example, FIG. 1 illustrates a conventional microwave curing apparatus 100 comprising electromagnetic radiation source 120 irradiating electromagnetic microwave energy 130 to cure a composite laminate 150. In one arrangement, this electromagnetic radiation source 120 may comprise a magnetron. Typically, a magnetron comprises an electron tube for amplifying or generating microwaves, with the flow of electrons controlled by an external magnetic field. As illustrated, this microwave curing apparatus 100 by way of a magnetron generates a non-uniform absorption of microwaves by the composite assembly 150. Such a non-uniform absorption by the composite laminate 150 may lead to a non-uniform temperature distribution throughout the composite laminate as it cures by way of the emitted electromagnetic energy 130. For example, as the composite laminate 150 receives electromagnetic energy 130 and undergoes cure, certain "hot spots" 160, 170, 180 may be created. As one example, a first hot spot 160 may be created in the composite laminate 150 at an area closest to the electromagnetic energy source 110. In addition, second and third hot spots 170, 180 may be created near the ends of the composite laminate 150 where the composite material is thin: where there is a low thermal mass. These rapid, uneven heat build up at such "hot spots" can cause local burning and arcing. In addition, dependent on the geometrical structure of the composite laminate 150 undergoing cure, it may be difficult to predict, monitor, and control, and may therefore result in reduced and unpredictable performance of the component.

In an effort to reduce such undesired temperature gradients, metal foils or metallic shields have been used to block or shield microwave radiation to certain areas (such as the ends or borders) of the composite laminate undergoing cure. However, use of such metal foil shields is disadvantageous as considerable manual effort is usually involved in applying the metal foils prior to cure and then having to remove such foils after the curing has been completed. Additionally, there is a risk that an incorrectly applied metal foil may cause defects in the fiber-composite component created.

Accordingly, there is a need for improved curing systems and apparatus for composite laminates. There is also a need for improved methods for curing such composite laminates that provide advantages over known electromagnetic and convective curing methods as noted above. It is, therefore, desirable to provide a method for curing a composite component using microwaves in combination with convection which reduces or controls the unpredictable nature of the temperature distribution in the composite laminate without the use of metallic foils and/or metallic shields.

SUMMARY

According to an exemplary arrangement, an apparatus for curing a composite laminate comprises an electromagnetic radiation source creating electromagnetic microwave energy in an enclosed volume. The apparatus further comprises a heating source for providing a convective airflow in the enclosed volume. A composite laminate assembly comprising a composite laminate is also placed in the enclosed volume, wherein the composite laminate of the composite laminate assembly is cured by both the electromagnetic microwave energy created by the electromagnetic radiation source, and the convective airflow provided by the heating source. The convective airflow may comprise a controlled convective airflow provided by the heating source. This controlled convective airflow provided by the heating source may also control a temperature of the heating source. The controlled convective airflow provided by the heating source may also control a humidity of the heating source. The controlled convective airflow provided by the heating source may also control an air mass flow rate of the heating source.

In one arrangement, the composite laminate assembly may comprise a bagged composite laminate assembly. In addition, the composite laminate assembly placed in the enclosed volume may comprise a first tooling caul plate. A first elastomeric blanket may be provided over the first tooling caul plate. The first elastomeric blanket provided over the first tooling caul plate may comprise a silicon blanket.

In one arrangement, a second tooling caul plate may be provided over the first elastomeric blanket. A first film may be provided over the second tooling caul plate, this first film helping to release resin moisture from the composite laminate during cure. In one arrangement, the first film comprises a fluorinated ethylene propylene film. A composite laminate may be provided over the first film that is provided over the second tooling caul plate.

A second film may be provided over the composite laminate so as to absorb resin volatiles. This second film may comprise a fluorinated ethylene propylene film. An elastomeric blanket may be provided over the first film so as to prevent the first film from overheating. A third tooling plate may be provided over the second film. An absorbing member may be provided over the third tooling plate so as to absorb resin volatiles from the first or second film during the cure process.

In one arrangement, the apparatus may comprise an electromagnetic radiation source that comprises a single frequency electromagnetic radiation source. Alternatively, the electromagnetic radiation source comprises a multiple frequency electromagnetic radiation source.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Embodiments of the structure and method may be used in aircraft, spacecraft, motor craft, watercraft, and other craft, as well as vehicles and other similar structures. In addition, embodiments of the structure and method may be used with integrated commercial building materials for both cooling applications, as well as energy harvesting from lightweight structures.

The present disclosure provides for embodiments of a vacuum curing apparatus or system comprising both an electromagnetic radiation source and a convection heating source. As just one example, the vacuum currring apparatus or system as presently disclosed may be used in a vacuum assisted resin transfer molding process (VRTM) utilizing a relatively low pressure mold reinforced composite molding process. In such a vacuum infusion process, the composite laminate is molded using a rigid mold to provide a desired part geometry along with a flexible membrane over the laminate, with an outer atmospheric pressure compressing the fiber tight against the rigid mold surface.

Figure 2:
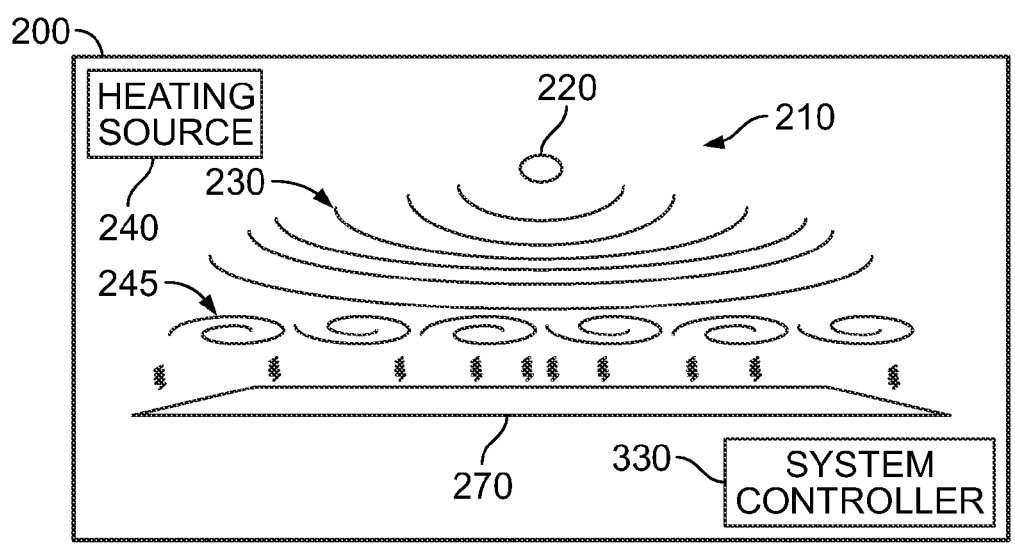
FIG. 2 is an illustration of an apparatus for curing a composite laminate according to disclosed embodiments.

For example, FIG. 2 is an illustration of an apparatus 200 for curing a composite laminate 270 according to disclosed embodiments. As illustrated, the apparatus comprises a heating source 240 and an electromagnetic radiation source 220 for emitting electromagnetic microwave energy 230. The apparatus 200 further comprises a heating source 240 for providing convective air flow 245 to enable a curing method that utilizes microwave heating in combination with convection heating to cure the composite laminate 270. A combination of the microwave energy 230 along with the convection heating air flow 245 will optimize the curing process maintaining uniform temperature profile through the curing time. Microwave heating uses composite particles to go through electromagnetic radiation in the microwave spectrum causing polarized molecules to rotate and build up thermal energy in a dielectric heating process. The additional convection circulates the internal air contained within an enclosed volume 210 of the apparatus 200 so as to redistribute the heating, and to assist in tuning the rate of heating. In one preferred arrangement, under the operation and control of a system controller 330, the electromagnetic radiation source 220 and the heating source 240 may be fired or operated sequentially. In one preferred arrangement, dependent on the type and configuration of the composite laminate 270 and the desired cure rate and process, both the heating sources 220, 240 intensity and sequence can be tailored to create a desired cure rate. As just one example, typical and conventional heating ramp rate to heat material to curing temperature (360 Fahrenheit or 250 Fahrenheit) is greatly dependent on thermal conduction of the material making up the composite laminate 270. As just one example, since carbon fiber re-enforced polymers (CFRPs) comprise a relatively low thermal conduction, then ramp rate is set to be a lower rate. If the ramp rate is too high, then the outer plies of the composite laminate 270 may be at risk of over-heating. In the illustrated curing apparatus 200 of FIG. 2, the use of microwave heating will introduce heating directly into the composite material 270 and it is the most efficient means of energy transfer into the system.

Figure 1:
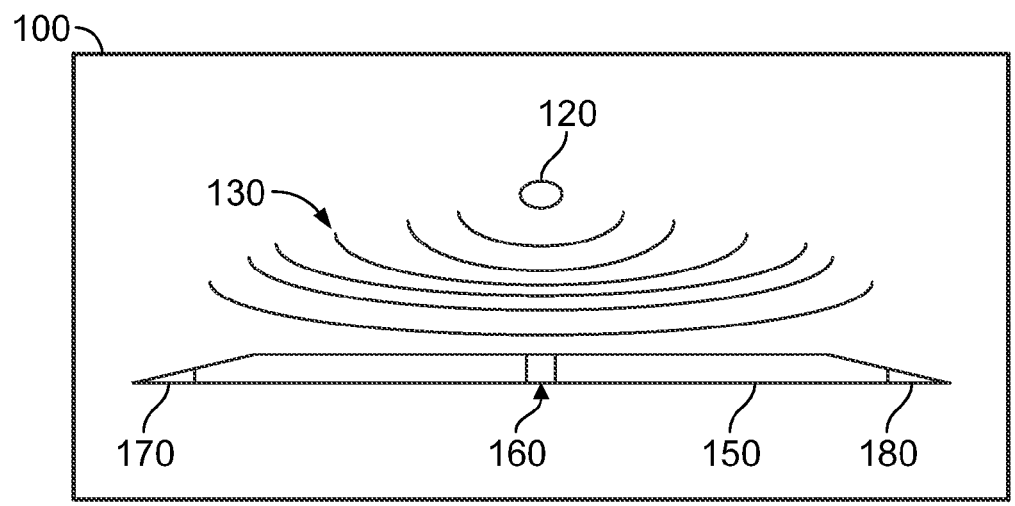
FIG. 1 is an illustration of a conventional microwave apparatus for curing a composite laminate.

Adding convection air into the microwave heating provides an enhanced method of redistributing heat to surrounding air inside the enclosed volume or heating chamber 210 and consequently making it easier to maintain uniform temperature heating onto the composite laminate 270. One advantage of such a system is that the combination of these two heating sources 240, 270 will help to drastically reduce the microwave arcing and sparkling problem discussed above with reference to the conventional system illustrated in FIG. 1. In addition, as just one example, it has been shown that the combination of microwave and convective curing can be approximately 50% faster than autoclave curing, so similar or better improvements can be expected when applying such a combination curing method in a composite repair. This is due to the fact that the epoxy cure occurs from the inside out within the composite laminate from microwave curing in addition to convection heating curing. The presently disclosed apparatus and process will enable a quicker composite cure with better efficiency.

Figure 3:
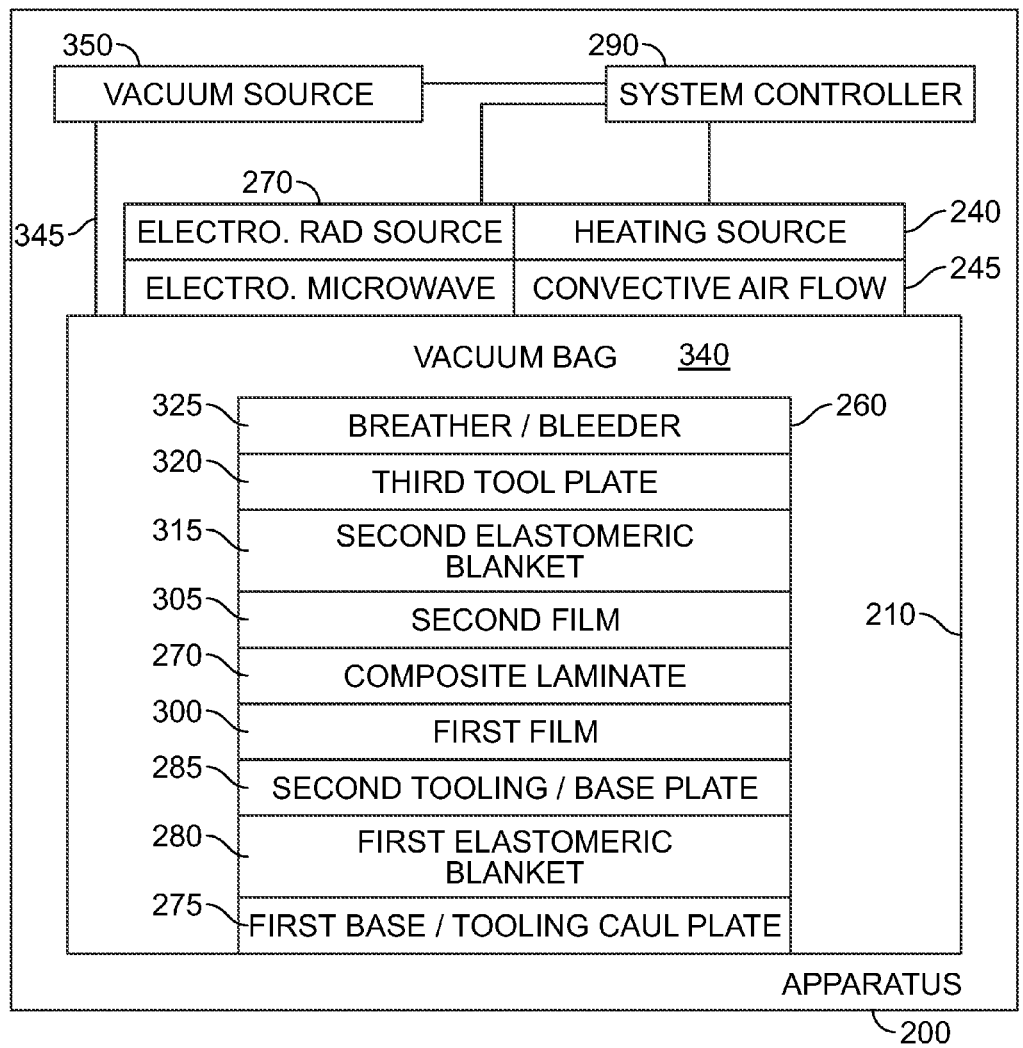
FIG. 3 is an illustration of a functional block diagram of a curing apparatus according to disclosed embodiments.
Figure 4:
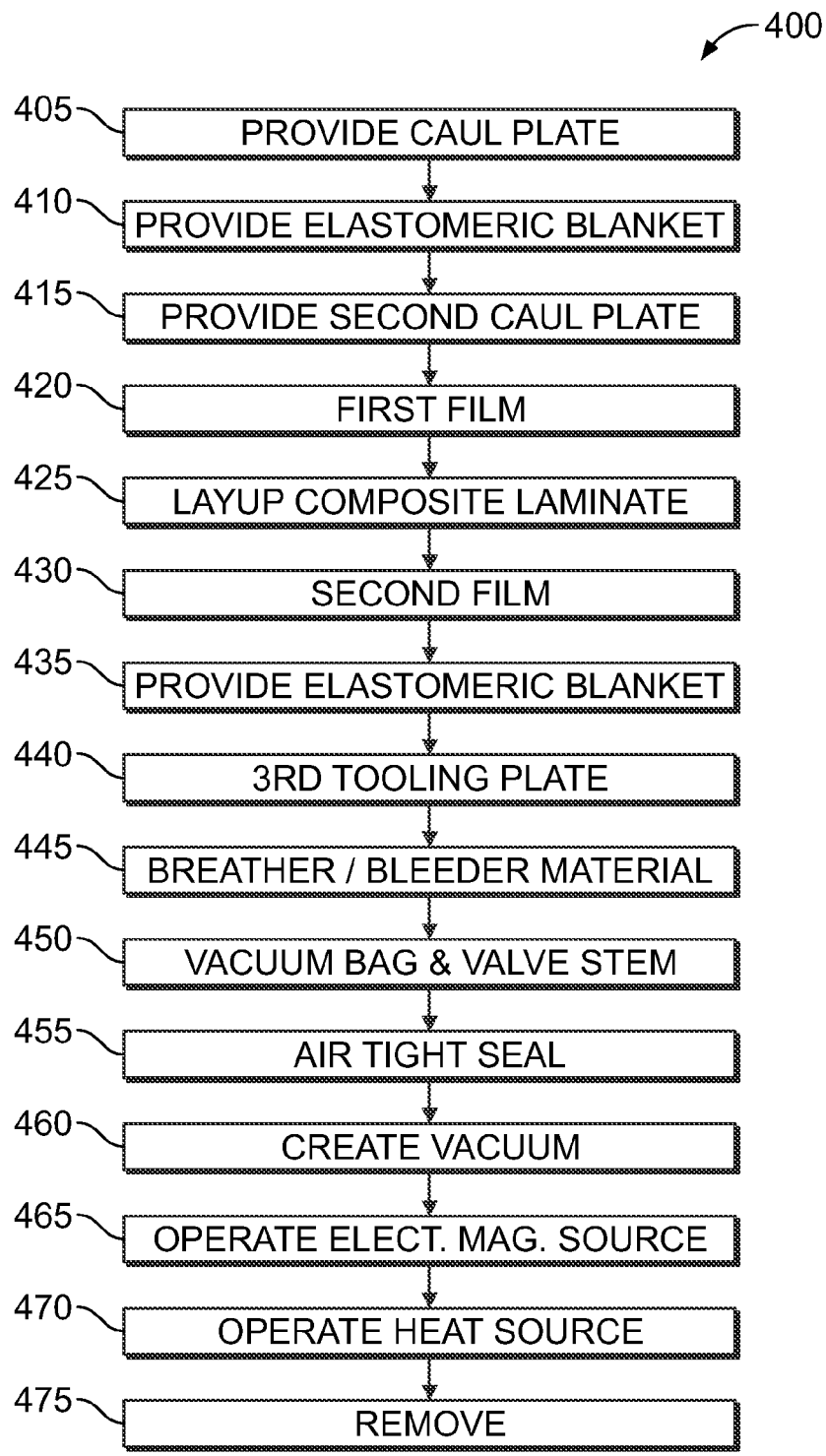
FIG. 4 is an illustration of a method of a composite laminate curing according to disclosed embodiments.

For example, FIG. 3 is an illustration of an exemplary functional block diagram of the curing apparatus 200 according to the disclosed embodiment illustrated in FIG. 2. FIG. 4 is an illustration of a method 400 of a composite laminate curing according to the disclosed embodiments. Referring now to both FIGS. 3 and 4, the curing system comprises both an electromagnetic radiation source 220 that creates electromagnetic microwave energy 230 within an enclosed volume or curing chamber 210. As just one example, such an electromagnetic radiation source 220 may comprise one or more magnetrons wherein each magnetron may comprise either a single or a multiple frequency radiation source. As just one example, a first magnetron of the electromagnetic radiation source 220 can be configured to emit electromagnetic energy 230 at a frequency of about 2.5 GHz. As just another example, a second magnetron of the electromagnetic radiation source 220 can be configured to emit electromagnetic energy 230 at a frequency different than about 2.5 GHz. The frequency emission and/or the location of these magnetrons within the enclosed volume or curing chamber 210 may be a function of the geometrical configuration of the composite laminate to be cured. In addition the frequency emission and/or the location of these magnetrons within the enclosed volume 210 may also be a function of a heat flow rate of the composite laminate to be cured. The operation of the electromagnetic radiation source 220 may be controlled by a system controller 290.

The curing apparatus 200 further comprises a heating source 240 for providing a convective airflow 245 within the enclosed volume 210. This convective airflow 245 may comprise a controlled convective airflow provided by the heating source 240. In addition, the controlled convective airflow provided by the heating source 240 controls a temperature of the heating source. The controlled convective airflow provided by the heating source 240 may also control a humidity of the heating source. In one arrangement, this heating source 240 may be controlled by the system controller 290.

Generally, the apparatus 200 may be operated by the system controller 290 such that a composite laminate assembly 260 comprising a composite laminate 270 that is placed within the enclosed volume 210 is cured by both the electromagnetic microwave energy 230 created by the electromagnetic radiation source 220, and the convective airflow 245 that is provided by the heating source 240. In one arrangement, the controlled convective airflow 245 provided by the heating source 240 controls an air mass flow rate of the heating source.

Returning to the curing apparatus 200 illustrated in FIG. 3 and the method illustrated in FIG. 4, the apparatus 200 may further comprise a first or a base tooling caul plate 275 (Step 405 FIG. 4). The apparatus may further comprise a first elastomeric blanket 280 that is provided over the first tooling caul plate 275. (Step 410 FIG. 4) In one arrangement, this first elastomeric blanket 280 provided over the first tooling caul plate 275 comprises a silicon or rubber blanket. The silicon or rubber blanket has been found to provide a number of advantages. For example, the use of such a silicon blanket reduces composite laminate wrinkling, aborbs moisture emitted from the composite during the cure process, and also provides enhanced heat disipation. The first tooling caul plate 275 may take any geometrical form. That is, the first tooling caul plate 275 may take a linear, a curved, a male, or a female tool form, and may be configured so as to form the composite laminate into a desired part geometry.

Next, a second tooling caul plate 285 is provided over the first elastomeric blanket 280. (Step 415 FIG. 4) Such a second tooling caul plate 285 may take the form of a unitary caul plate. Alternatively, such a second tooling caul plate 285 may take the form of a caul plate comprising two or more segments. Such a segmented caul plate may be used based on the type and geometrical structure of the composite laminate 270 to be cured. After the second tooling caul plate 285 has been provided, a first film 300 may be provided over the second tooling caul plate 285. (Step 420 FIG. 4) Such a first film 300 may be provided so as to help to release resin moisture from the composite laminate 279 during the curing process. In one preferred arrangement, the first film 300 comprises a fluorinated ethylene propylene film. In another preferred arrangement, the first film 300 comprises a polytetraflouroethylene (PTFE) type film (e.g., a Teflon film).

Next, the composite laminate 270 is laid up over the first film 300 that has been provided over the second tooling caul plate 285. (Step 425 FIG. 4) The composite laminate 270 may comprise a plurality of "pre-preg" plies of composite material. In one arrangement, each ply may comprise a layer of woven or unidirectional carbon fibers impregnated with a polymer resin matrix material in an un-cured or partially cured state. In one preferred arrangement, the plies may be laid up manually or by hand. In an alternative arrangement, the plies may be laid up using advanced fiber placement ("AFP") or automated tape laying ("ATL") manufacturing methods (or by any other known method) in the desired positions and orientations as determined during the design phase.

As can be seen from FIG. 3, a second film 305 may be provided over the composite laminate 270. (Step 430 FIG. 4) Such a second film 305 may be provided so as to absorb water released from the composite laminate 270 during the curing process. In one preferred arrangement, the second film 305 comprises a fluorinated ethylene propylene film (FEP).

After the second film 305 has been provided over the second tooling caul plate 285, an elastomeric blanket 315 is provided over the second film 305. (Step 435 FIG. 4) Such an elastomeric blanket 315 may be provided so as to prevent the second film 305 from overheating during the cure process.

A third tooling plate 320 may be provided over the elastomeric blanket 315. (Step 440 FIG. 4) Such a third tooling plate 320 may comprise a caul plate that helps to prevent bridging and wrinkling of the composite laminate assembly. This third tool plate 320 may also be configured for applying molding pressure to the composite laminate 270 so as to impart a desired shape to final cured composite. Finally, a breather material 325 may be provided over the third tooling plate 320. (Step 445 FIG. 4) Such a breather material 325 may act as a distributor for the air (also a vacuum) and for escaping volatiles and gasses, as well as a buffer between bag wrinkles and part surfaces. Such a breather material 325 may also act to absorb resin volatiles emitted from the first film 300 or second film 305 during the cure process.

Next, a vacuum bag 340 may be placed over the composite laminate assembly 260 with a vacuum valve stem 345 provided through the vacuum bag 340. (Step 450 FIG. 4) The position and location of the vacuum valve stem 345 may be a function of a desired cure property of the desired composite laminiate part, such as a resin flow pattern of composite laminate. A fitting may be provided in the vacuum valve stem 345 that tightens on the vacuum bag 340. The vacuum bag 340 is then pressed onto a bag sealant so as to create an air tight seal around the entire composite laminate assembly 260. (Step 455 FIG. 4) a vacuum source 350 may then be activated by the system controller 290 such that a vacuum within the vacuum bag 340 is created according to design specifications. (Step 460 FIG. 4) The vacuum source 350 is operable to draw air out from the sealed vacuum chamber between the various component parts of the composite laminate assembly 260 so as to create a vacuum.

The system controller 290 may then control the operation of the electromagnetic radiation source 310 so as to create a desired amount of electromagnetic microwave energy 312 within enclosed volume 210. (Step 465 FIG. 4) Similarly, the system controller 330 may then control the operation of the heating source 240 so as to create a desired amount of convective air flow 245 within the enclosed volume 210. (Step 470). In one arrangement, both of these sources 270, 240 are operated simultaneously. In an alternative arrangement, these sources 270, 240 may be operated sequentially, or at least partially sequentially. As those of skill in the art will recognize, alternative operating arrangements of these sources 270, 240 may also be used.

At the end of the curing process, the composite laminate 270 is substantially cured and the plies within the laminate are consolidated so to form a continuous, cured composite laminate. This cured laminate may then be removed from the enclosed volume 210, the various component parts (e.g., the elastomeric blankets, the breather materials, and the vacuum bag) removed from the composite laminate assembly, and the various tooling plates 275, 285, and 320 allowed to cool before any further finishing processing steps take place. (Step 475, FIG. 4).

Figure 5:
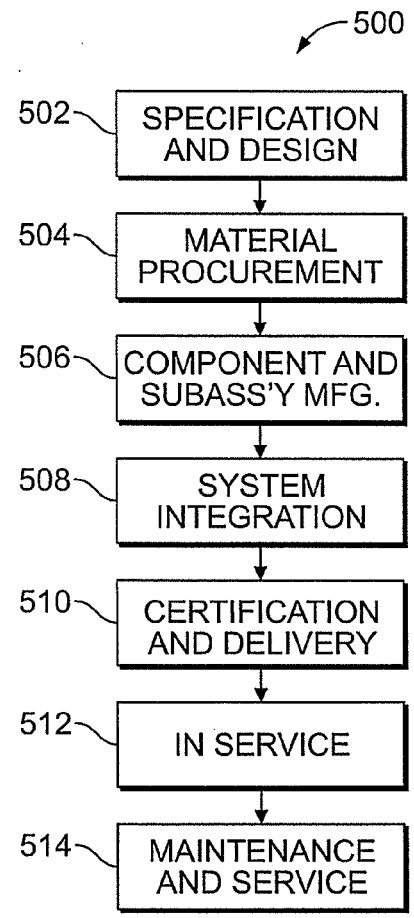
FIG. 5 is an illustration of a flow diagram of an embodiment of an aircraft manufacturing and service method of the disclosure.
Figure 6:
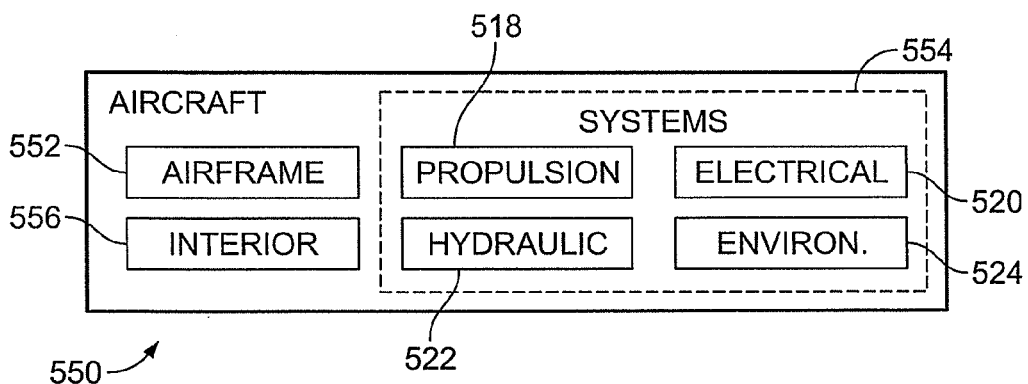
FIG. 6 is an illustration of a functional block diagram of an aircraft.

Embodiments of the disclosure may find use in a variety of potential applications, particularly in the transportation industry, including for example, aerospace, marine, automotive applications and other applications where thermoplastic composite tubular structures may be used. Therefore, referring now to FIGS. 5 and 6, embodiments of the disclosure may be used in the context of an aircraft manufacturing and service method 500 as shown in FIG. 5 and an aircraft 550 as shown in FIG. 6. Aircraft applications of the disclosed embodiments may include, for example, without limitation, the design and fabrication of a composite laminate cured by way of both electromagnetic and convection heating. During pre-production, exemplary method 500 may include specification and design 502 of the aircraft 550 and material procurement 504. As just one example, for the specification and design of the aircraft related composite laminates cured by both electromagnetic and convection heating, the type and geometrical properties of the thermoplastic composite material making up the composite laminate may be determined at this step.

As another example, during this specification and design step 502, in one particular composite laminate arrangement, the amount and the location of electromagnetic heat and time for this application will be predetermined as the heating source is typically ramped up and down slowly in an attempt to minimize part stress and maximize overall temperature control. As such, operation and duty cycles of the heating sources (i.e., the electromagnetic radiation source 220 and the heating source 240) may also be determined during this specification and design step 502. That is, it may be determined that the heating sources may be operated simultaneously or that they may be operated sequentially. In addition, temperature, humidity, and air flow operating parameters may also be determined during this specification and design step 502. In addition, during this specification and design step 502 of method 500, the type of composite laminate layup may be determined. For example, during this process step 502, it may be determined that either a manual or an automatic layup may be desired.

During production, component and subassembly manufacturing 506 and system integration 508 of the aircraft 550 takes place. After such a component and subassembly manufacturing step, the aircraft 550 may go through certification and delivery 510 in order to be placed in service 512. While in service by a customer, the aircraft 550 is scheduled for routine maintenance and service 514, which may also include modification, reconfiguration, refurbishment, and so on.

Each of the process steps of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 550 produced by exemplary method 500 illustrated in FIG. 5 may include an airframe 552 with a plurality of high-level systems 554 and an interior 556. Examples of high-level systems 554 may include one or more of a propulsion system 518, an electrical system 520, a hydraulic system 522, and an environmental system 524. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process may be fabricated or manufactured in a manner similar to components or subassemblies produced while the aircraft 550 is in service. Also, one or more apparatus embodiments, method embodiments, or a combination thereof may be utilized during the production stages 502 and 504, for example, by substantially expediting assembly of or reducing the cost of an aircraft 550. Similarly, one or more of apparatus embodiments, method embodiments, or a combination thereof may be utilized while the aircraft 550 is in service, for example and without limitation, to maintenance and service 504.

The presently disclosed methods and apparatus for composite curing results in certain advantages over known types of composite curing methods. For example, the presently disclosed methods and apparatus provides for a more efficient and cost effective composite curing process. In addition, in one disclosed apparatus, as the convection air is circulated within the enclosed volume so as to redistribute the heat generated by the composite laminate from microwave heating to the surround, local hot spots, sparkling, and edge burning are consequently reduced. Unpredictable temperature distributions are—reduced and unpredictable performance that oftentimes occurs during typical electromagnetic wave energy composite laminate curing processes may also be reduced. As such, the presently disclosed methods and apparatus provide enhanced thermal management and can prevent thermal runaway areas. Consequently, composite cure cycle times may be further reduced while energy consumption during the curing cycles may also be reduced.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. An apparatus for curing a composite laminate, the apparatus comprising:
   an electromagnetic radiation source creating electromagnetic microwave energy in an enclosed volume; and
   a heating source for providing a convective airflow in the enclosed volume,
   wherein the apparatus is configured to receive a composite laminate assembly comprising a composite laminate, the composite laminate assembly placed in the enclosed volume, and
   wherein the composite laminate of the composite laminate assembly is cured by both
      the electromagnetic microwave energy created by the electromagnetic radiation source, and
      the convective airflow provided by the heating source.

2. The apparatus of claim 1, wherein the convective airflow comprises a controlled convective airflow provided by the heating source.

3. The apparatus of claim 2 wherein the controlled convective airflow provided by the heating source controls a temperature of the heating source.

4. The apparatus of claim 2 wherein the controlled convective airflow provided by the heating source controls a humidity of the heating source.

5. The apparatus of claim 2 wherein the controlled convective airflow provided by the heating source controls an air mass flow rate of the heating source.

6. The apparatus of claim 1, wherein the composite laminate assembly comprises a bagged composite laminate assembly.

7. The apparatus of claim 1 wherein the composite laminate assembly placed in the enclosed volume comprises:
   a first tooling caul plate;
   a first elastomeric blanket provided over the first tooling caul plate, the first elastomeric blanket provided over the first tooling caul plate comprising a silicon blanket;
   a second tooling caul plate provided over the first elastomeric blanket; and
   a first film provided over the second tooling caul plate, the first film helping to release resin moisture from the composite laminate during cure.

8. The apparatus of claim 7 wherein the first film comprises a fluorinated ethylene propylene film.

9. The apparatus of claim 7, wherein the composite laminate is provided over the first film that is provided over the second tooling caul plate.

10. The apparatus for claim 9, wherein a second film is provided over the composite laminate so as to absorb resin volatiles, the second film comprises a fluorinated ethylene propylene film.

11. The apparatus of claim 10 further comprising a third tooling plate provided over the second film.

12. The apparatus of claim 11 further comprising an absorbing member provided over the third tooling plate so as to absorb resin volatiles from the first or second film during the cure process.

13. The apparatus of claim 1 wherein the electromagnetic radiation source creating electromagnetic microwave energy in the enclosed volume comprises at least one magnetron.

14. The apparatus of claim 1 wherein a frequency emission of the electromagnetic radiation source is a function of a heat flow rate of the composite laminate to be cured.

15. The apparatus of claim 1 wherein a location of the electromagnetic radiation source within the enclosed volume is a function of a heat flow rate of the composite laminate to be cured.

16. A method of curing a composite laminate, the method comprising the steps of:
  creating electromagnetic microwave energy in an enclosed volume;
  providing a convective airflow in the enclosed volume;
  placing a composite laminate assembly comprising a composite laminate in the enclosed volume; and
  curing the composite laminate of the composite laminate assembly by the electromagnetic microwave energy created and the convective airflow provided by the heating source.

17. The method of claim 16, further comprising the step of
  bagging the composite laminate assembly.

18. The method of claim 16 further comprising the steps of
  placing the composite laminate assembly on a first tooling caul plate;
  providing a first elastomeric blanket over the first tooling caul plate, wherein the first elastomeric blanket provided over the first tooling caul plate comprises a silicon blanket;
  providing a first film over the second tooling caul plate, wherein the film helps to release resin moisture from the composite laminate during cure; and
  providing a composite laminate over the first film that is provided over the second tooling caul plate.

19. The method of claim 17, further comprising the step of
  providing an elastomeric blanket over the first film so as to prevent the first film from overheating;
  providing a third tooling plate over the second film; and
  providing an absorbing member over the third tooling plate so as to absorb resin volatiles from the first or second film during the curing of the composite.

20. The method of claim 15 wherein
  the electromagnetic radiation source creating electromagnetic microwave energy in the enclosed volume comprises at least one magnetron.

\* \* \* \* \*